United States Patent
Huang et al.

(10) Patent No.: US 11,290,568 B2
(45) Date of Patent: Mar. 29, 2022

(54) METHOD, CONTROLLER, AND SYSTEM FOR ESTABLISHING FORWARDING PATH IN NETWORK

(71) Applicant: HUAWEI TECHNOLOGIES CO., LTD., Shenzhen (CN)

(72) Inventors: Zonghe Huang, Shenzhen (CN); Chengyong Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/703,675

(22) Filed: Dec. 4, 2019

(65) Prior Publication Data

US 2020/0106858 A1 Apr. 2, 2020

Related U.S. Application Data

(63) Continuation of application No. PCT/CN2018/091688, filed on Jun. 15, 2018.

(30) Foreign Application Priority Data

Jun. 20, 2017 (CN) .......................... 201710470662.9

(51) Int. Cl.
*H04L 29/08* (2006.01)
*H04L 12/715* (2013.01)
(Continued)

(52) U.S. Cl.
CPC ............ *H04L 67/327* (2013.01); *H04L 45/04* (2013.01); *H04L 67/10* (2013.01);
(Continued)

(58) Field of Classification Search
CPC ....... H04L 67/10; H04L 67/327; H04L 45/04; H04L 45/50; H04L 12/4641; H04L 41/12; H04L 69/18
See application file for complete search history.

(56) References Cited

U.S. PATENT DOCUMENTS 7,643,430 B2 * 1/2010 Morandin ............. H04J 3/0682
370/252
2006/0098587 A1 5/2006 Vasseur et al.
(Continued)

FOREIGN PATENT DOCUMENTS

CN 104753713 A 7/2015
CN 105960783 A 9/2016
(Continued)

OTHER PUBLICATIONS

The extended European search report dated Apr. 14, 2020 from corresponding application No. EP 18821178.3.
(Continued)

*Primary Examiner* — Azizul Choudhury
(74) *Attorney, Agent, or Firm* — Hauptman Ham, LLP

(57) ABSTRACT

The application discloses a method for establishing a forwarding path in a network, where the network includes a SC and a plurality of DCs, the SC manages the plurality of DCs, each of the plurality of DCs manages one domain, and the method includes: receiving, by the SC, a service request message; selecting, by the SC, a latency distribution manner based on the service request message; dividing, by the SC, a first latency into a plurality of latency periods; sending, by the SC, each of the plurality of latency periods to a DC corresponding to the latency period, and triggering each of the plurality of DCs to establish a forwarding path segment in the domain managed by the DC; and connecting, by the SC, the plurality of forwarding path segments established by the plurality of DCs, to form a forwarding path.

20 Claims, 10 Drawing Sheets

(51) Int. Cl.
*H04L 12/46* (2006.01)
*H04L 12/24* (2006.01)
*H04L 12/723* (2013.01)
*H04L 29/06* (2006.01)
*H04L 67/63* (2022.01)
*H04L 45/00* (2022.01)
*H04L 67/10* (2022.01)
*H04L 41/12* (2022.01)
*H04L 45/50* (2022.01)
*H04L 69/18* (2022.01)

(52) U.S. Cl.
CPC .......... *H04L 12/4641* (2013.01); *H04L 41/12* (2013.01); *H04L 45/50* (2013.01); *H04L 69/18* (2013.01)

(56) References Cited

U.S. PATENT DOCUMENTS

| | | | |
|---|---|---|---|
| 2006/0153186 A1* | 7/2006 | Bector | H04L 49/254 370/389 |
| 2007/0002883 A1* | 1/2007 | Edsall | H04L 67/1034 370/422 |
| 2010/0125619 A1* | 5/2010 | Ferre | G06F 11/2094 707/828 |
| 2014/0304543 A1 | 10/2014 | Ilyas et al. | |
| 2015/0188837 A1 | 7/2015 | Djukic et al. | |
| 2015/0215235 A1* | 7/2015 | Li | H04L 45/04 370/235 |

FOREIGN PATENT DOCUMENTS

| | | |
|---|---|---|
| CN | 106375214 A | 2/2017 |
| CN | 106789637 A | 5/2017 |
| CN | 107370673 A | 11/2017 |
| EP | 3090517 A1 | 11/2016 |
| WO | 2016106649 A1 | 7/2016 |
| WO | 2017063694 A1 | 4/2017 |

OTHER PUBLICATIONS

T-REC-M.2301-200207-I!!PDF-E,"Performance objectives and procedures for provisioning and maintenance of IP-based networks",ITU-T,Telecommunication Standardization Sector of ITU,dated Jul. 2002,total 26 pages.

RFC5357 K. Hedayat et al.,"A Two-Way Active Measurement Protocol (TWAMP)",Network Working Group,dated Oct. 2008,total 26 pages.

G.8013/Y.1731 Operation, administration and maintenance (OAM) functions and mechanisms for Ethernet-based networks,Telecommunication Standardization Sector of ITU,total 102 pages.

YD/T 1171-2001 "IP Network Specification—Network Performance Parameters and Objectives",dated Dec. 11, 2001, total 32 pages.

Office Action dated Aug. 28, 2019 from corresponding application No. CN 201710470662.9.

International search report dated Sep. 10, 2018 from corresponding application No. PCT/CN2018/091688.

* cited by examiner

METHOD, CONTROLLER, AND SYSTEM FOR ESTABLISHING FORWARDING PATH IN NETWORK

CROSS-REFERENCE TO RELATED APPLICATIONS

This application is a continuation of International Application No. PCT/CN2018/091688, filed on Jun. 15, 2018, which claims priority to Chinese Patent Application No. 201710470662.9, filed on Jun. 20, 2017. The disclosures of the aforementioned applications are hereby incorporated by reference in their entireties.

TECHNICAL FIELD

The application relates to the communications field, and in particular, to a method, a controller, and a system for establishing a forwarding path in a network.

BACKGROUND

As shown in FIG. 1, end-to-end user data transmission passes through a convergence router such as a core router and an interconnect router of a provincial network to enter an interconnect router and a core router of another provincial network, and finally arrives at a terminal device of a destination user. The core router could be a provider edge (PE), and the interconnect router could be an operator gateway border router (OGBR). The data transmission crosses two autonomous systems (AS), for example, an AS-1 and an AS-2.

A hierarchical controller is obtained through evolution based on an architecture of a domain controller (DC), and is obtained by disposing one super controller (SC) at an upper layer of the DC, where one SC may perform orchestration and management on a plurality of domain controllers. The hierarchical controller is mainly used to resolve a problem that in a cross-domain seamless multi-protocol label switching (MPLS) virtual private network (VPN) service deployment scenario, cross-domain service deployment cannot be implemented due to a DC. In addition, for an operator, the SC can manage DCs of different vendors, to simplify network operation and maintenance.

However, currently, a latency on demand (LOD) of a software defined network (SDN) cross-domain service does not support deployment of a service having an end to end (E2E) latency restriction. It is assumed that in a network crossing three AS domains, a user needs to deploy a virtual private local area network service (VPLS) private line service having a latency requirement of 10 ms. Whether to perform latency distribution according to 3:3:4 or 2:5:3, or how to perform distribution when a network topology or a network capacity changes is a technical problem to be resolved.

SUMMARY

This application provides a method for establishing a forwarding path in a network, to resolve a prior-art technical problem that a latency restriction of a forwarding path cannot be distributed for different services.

|[MS1] An aspect of this application provides a method for establishing a forwarding path in a network, where the network includes an SC and a plurality of DCs, the SC manages the plurality of DCs, each of the plurality of DCs manages one domain, and the method includes:

receiving, by the SC, a service request message, where the service request message includes a service type and a first latency, the service request message is used to request the SC to establish, in the network, a forwarding path used to transmit a service corresponding to the service type, and a latency of the forwarding path is less than or equal to the first latency;

selecting, by the SC, a latency distribution manner based on the service request message;

dividing, by the SC, the first latency into a plurality of latency periods based on the latency distribution manner, where the plurality of latency periods are in a one-to-one correspondence to the plurality of DCs;

sending, by the SC, each of the plurality of latency periods to a DC corresponding to the latency period, and triggering each of the plurality of DCs to establish a forwarding path segment in the domain managed by the DC, where a latency of each forwarding path segment is less than or equal to a latency period corresponding to the DC; and connecting, by the SC, the plurality of forwarding path segments established by the plurality of DCs, to form the forwarding path.

In the foregoing technical solution, the latency of the established forwarding path may be customized and intelligently matched based on a service requirement, and the service type is determined to select a distribution manner suitable for the service, to resolve a prior-art technical problem that there is no principle suitable for distributing a latency restriction of a forwarding path. In the foregoing technical solution, network utilization can be better during service path iteration, and network optimization can better meet a customer requirement.

In some embodiments, when a difference between quantities of network nodes in the domains managed by the plurality of DCs is in a predetermined range, the latency distribution manner selected by the SC is an average latency distribution (ALRD) manner, and the dividing, by the SC, the first latency into a plurality of latency periods based on the ALRD manner includes:

equally dividing, by the SC, the first latency into the plurality of latency periods based on a quantity of the forwarding path segments.

In some embodiments, when a service identified by the service type is a latency-sensitive service, the latency distribution manner selected by the SC is a minimum latency rate distribution (MIRD) manner, and the dividing, by the SC, the first latency into a plurality of latency periods based on the MIRD manner includes:

obtaining, by the SC, a second latency of a path having a minimum latency in paths in the domain managed by each of the plurality of DCs; and dividing, by the SC, the first latency into the plurality of latency periods based on a ratio between the obtained plurality of second latencies.

In some embodiments, when a service identified by the service type is a latency-insensitive service, the latency distribution manner selected by the SC is a maximum latency rate distribution (MARD) manner, and the dividing, by the SC, the first latency into a plurality of latency periods based on the MARD manner includes:

obtaining, by the SC, a third latency of a path having a maximum latency in paths in the domain managed by each of the plurality of DCs; and dividing, by the SC, the first latency into the plurality of latency periods based on a ratio between the obtained plurality of third latencies.

In some embodiments, when a service identified by the service type is a service in which a size of a to-be-transmitted file exceeds a preset value, the latency distribution manner selected by the SC is an average fiber utilization rate distribution (AFRD) manner, and the dividing, by the SC, the first latency into a plurality of latency periods based on the AFRD manner includes:

obtaining, by the SC, a fiber utilization rate in the domain managed by each of the plurality of DCs; and dividing, by the SC, the first latency into the plurality of latency periods based on a ratio between the obtained plurality of fiber utilization rates.

The AFRD manner can reflect link utilization in a domain, so that network utilization is better during service path iteration.

In some embodiments, when a service identified by the service type is a big data service, the latency distribution manner selected by the SC is a bandwidth occupied rate distribution (BORD) manner, and the dividing, by the SC, the first latency into a plurality of latency periods based on the BORD manner includes:

obtaining, by the SC, traffic in the domain managed by each of the plurality of DCs, and calculating, based on the obtained traffic, a percentage of the traffic of each DC in a total bandwidth of the DC; and dividing, by the SC, the first latency into the plurality of latency periods based on a ratio between the percentages of the traffic of the plurality of the DCs in the total bandwidths of the DCs.

The BORD manner can reflect link utilization in a domain, so that network utilization is better during service path iteration.

In some embodiments, the latency distribution calculation manner selected by the SC is a customized latency rate distribution manner, and the SC divides the first latency into the plurality of latency periods based on a ratio specified by a user.

According to the method in this embodiment of the application, for different service types, the SC can select different latency rate distribution methods. In this way, the latency restriction of the forwarding path can be dynamically distributed, to meet different service requirements.

Another aspect of this application provides an SC for establishing a forwarding path in a network, where the network includes the SC and a plurality of domain controllers DCs, the SC manages the plurality of DCs, each of the plurality of DCs manages one domain, and the SC includes:

a receiving unit, configured to receive a service request message, where the service request message includes a service type and a first latency, the service request message is used to request the SC to establish, in the network, a forwarding path used to transmit a service corresponding to the service type, and a latency of the forwarding path is less than or equal to the first latency;

a selection unit, configured to select a latency distribution manner based on the service request message;

a processing unit, configured to divide the first latency into a plurality of latency periods based on the latency distribution manner, where the plurality of latency periods are in a one-to-one correspondence to the plurality of DCs; and a sending unit, configured to: send each of the plurality of latency periods to a DC corresponding to the latency period, and trigger each of the plurality of DCs to establish a forwarding path segment in the domain managed by the DC, where a latency of each forwarding path segment is less than or equal to a latency period corresponding to the DC, where the processing unit is further configured to connect the plurality of forwarding path segments established by the plurality of DCs, to form the forwarding path.

In some embodiments, the SC further includes:

a determining unit, configured to determine qualities of network nodes in the domains in which the forwarding path segments are established, where the selection unit is configured to: when the determining unit determines that a difference between the quantities of the network nodes in the domains in which the forwarding path segments are established is in a predetermined range, select an ALRD manner as the latency distribution manner, and the processing unit is further configured to equally divide the first latency into the plurality of latency periods based on a quantity of the forwarding path segments.

In some embodiments, the SC further includes:

a determining unit, configured to determine that a service identified by the service type is a latency-sensitive service, where the selection unit is configured to: when the determining unit determines that the service identified by the service type is a latency-sensitive service, select an MIRD manner as the latency distribution manner; and that the SC divides the first latency into a plurality of latency periods based on the MIRD manner includes:

obtaining, by the SC, a second latency of a path having a minimum latency in paths in the domain managed by each of the plurality of DCs; and dividing, by the SC, the first latency into the plurality of latency periods based on a ratio between the obtained plurality of second latencies.

In some embodiments, the SC further includes:

a determining unit, configured to determine that a service identified by the service type is a latency-insensitive service, where the selection unit is configured to: when the determining unit determines that the service identified by the service type is a latency-insensitive service, select an MARD manner as the latency distribution manner; and that the SC divides the first latency into a plurality of latency periods based on the MARD manner includes:

obtaining, by the SC, a third latency of a path having a maximum latency in paths in the domain managed by each of the plurality of DCs; and dividing, by the SC, the first latency into the plurality of latency periods based on a ratio between the obtained plurality of third latencies.

In some embodiments, the SC further includes:

a determining unit, configured to determine that a service identified by the service type is a service in which a size of a to-be-transmitted file exceeds a preset value, where the selection unit is configured to: when the determining unit determines that the service identified by the service type is a service in which a size of a to-be-transmitted file exceeds the preset value, select an AFRD manner as the latency distribution manner; and that the SC divides the first latency into a plurality of latency periods based on the AFRD manner includes:

obtaining, by the SC, a fiber utilization rate in the domain managed by each of the plurality of DCs; and dividing, by the SC, the first latency into the plurality of latency periods based on a ratio between the obtained plurality of fiber utilization rates.

In some embodiments, the SC further includes:

a determining unit, configured to determine that a service identified by the service type is a big data service, where the selection unit is configured to: when the determining unit determines that the service identified by the service type is a big data service, select a BORD manner as the latency distribution manner; and that the SC divides the first latency into a plurality of latency periods based on the BORD manner includes:

obtaining, by the SC, traffic in the domain managed by each of the plurality of DCs, and calculating, based on the obtained traffic, a percentage of the traffic of each DC in a total bandwidth of the DC; and dividing, by the SC, the first latency into the plurality of latency periods based on a ratio between the percentages of the traffic of the plurality of the DCs in the total bandwidths of the DCs.

In some embodiments, the latency distribution manner selected by the selection unit is a customized latency rate distribution manner, and the latency is divided into the plurality of latency periods based on a ratio specified by a user.

Another aspect of this application provides a method for establishing a forwarding path in a network, where the network includes an SC and a plurality of DCs, the SC manages the plurality of DCs, each of the plurality of DCs manages one domain, and the method includes:

receiving, by the DC, a latency period sent by the SC, where the latency period is obtained by the SC after the SC selects a latency distribution manner based on a service request message and then divides a first latency in the service request message;

establishing, by the DC, a forwarding path segment in the managed domain, where a latency of the forwarding path segment is less than or equal to the latency period; and sending, by the DC, information about the forwarding path segment to the SC, and triggering the SC to connect the plurality of forwarding path segments established by the plurality of DCs, to form the forwarding path.

In the foregoing technical solution, a latency of the established forwarding path may be customized and intelligently matched based on a service requirement, and the service type is determined to select a distribution manner suitable for the service, to resolve a prior-art technical problem that there is no principle suitable for distributing a latency restriction of a forwarding path. In the foregoing solution, network utilization can be better during service path iteration, and network optimization can better meet a customer requirement.

In some embodiments, when a difference between quantities of network nodes in the domains managed by the plurality of DCs is in a predetermined range, the latency distribution manner selected by the SC is an ALRD manner, and the dividing, by the SC, the first latency based on the ALRD manner, to obtain the latency period includes:

equally dividing, by the SC, the first latency based on a quantity of the DCs, to obtain the latency period.

In some embodiments, when a service identified by the service type is a latency-sensitive service, the latency distribution manner selected by the SC is an MIRD manner, and the dividing, by the SC, the first latency based on the MIRD manner, to obtain the latency period includes:

obtaining, by the SC, a second latency of a path having a minimum latency in paths in the domain managed by each of the plurality of DCs; and dividing, by the SC, the first latency based on a ratio between the obtained plurality of second latencies, to obtain the latency period.

In some embodiments, when a service identified by the service type is a latency-insensitive service, the latency distribution manner selected by the SC is an MARD manner, and the dividing, by the SC, the first latency based on the MARD manner, to obtain the latency period includes:

obtaining, by the SC, a third latency of a path having a maximum latency in paths in the domain managed by each of the plurality of DCs; and dividing, by the SC, the first latency based on a ratio between the obtained plurality of third latencies, to obtain the latency period.

In some embodiments, when a service identified by the service type is a service in which a size of a to-be-transmitted file exceeds a preset value, the latency distribution manner selected by the SC is an AFRD manner, and the dividing, by the SC, the first latency based on the AFRD manner, to obtain the latency period includes:

obtaining, by the SC, a fiber utilization rate in the domain managed by each of the plurality of DCs; and dividing, by the SC, the first latency based on a ratio between the obtained plurality of fiber utilization rates, to obtain the latency period.

The AFRD manner can reflect link utilization in a domain, so that network utilization is better during service path iteration.

In some embodiments, when a service identified by the service type is a big data service, the latency distribution manner selected by the SC is a BORD manner, and the dividing, by the SC, the first latency based on the BORD manner, to obtain the latency period includes:

obtaining, by the SC, traffic in the domain managed by each of the plurality of DCs, and calculating, based on the obtained traffic, a percentage of the traffic of each DC in a total bandwidth of the DC; and dividing, by the SC, the first latency based on a ratio between the percentages of the traffic of the plurality of the DCs in the total bandwidths of the DCs, to obtain the latency period.

The BORD manner can reflect link utilization in a domain, so that network utilization is better during service path iteration.

In some embodiments, the latency distribution calculation manner selected by the SC is a customized latency rate distribution manner, and the SC divides the first latency based on a ratio specified by a user, to obtain the latency period.

Another aspect of this application provides a DC for establishing a forwarding path in a network, where the network includes a super controller SC and a plurality of DCs, the SC manages the plurality of DCs, each of the plurality of DCs manages one domain, and the DC includes:

a receiving unit, configured to receive a latency period sent by the SC, where the latency period is obtained by the SC after the SC selects a latency distribution manner based on a service request message and then divides a first latency in the service request message;

an establishment unit, configured to establish a forwarding path segment in the domain, where a latency of the forwarding path segment is less than or equal to the latency period; and a sending unit, configured to: send information about the forwarding path segment to the SC, and trigger the SC to connect the plurality of forwarding path segments established by the establishment units, to form the forwarding path.

Another aspect of this application provides a network system for establishing a forwarding path, including an SC, a first DC, and a second DC, where the SC manages the first DC and the second DC, and each of the first DC and the second DC manages one domain;

the SC is configured to: receive a service request message, where the service request message includes a service type and a first latency, the service request message is used to request the SC to establish, in the network, a forwarding path used to transmit a service corresponding to the service type, and a latency of the forwarding path is less than or equal to the first latency; select a latency distribution manner based on the service request message; divide the first latency into a first latency period and a second latency period based on the latency distribution manner; send the first latency period to the first DC; and send the second latency period to the second DC;

the first DC is configured to: receive the first latency period sent by the SC; establish, based on the first latency period, a first forwarding path segment in the domain managed by the first DC, where a latency of the first forwarding path segment is less than or equal to the first latency period; and send information about the first forwarding path segment to the SC;

the second DC is configured to: receive the second latency period sent by the SC; establish, based on the second latency period, a second forwarding path segment in the domain managed by the second DC, where a latency of the second forwarding path segment is less than or equal to the second latency period; and send information about the second forwarding path segment to the SC; and the SC is further configured to connect the first forwarding path segment and the second forwarding path segment based on the information about the first forwarding path and the information about the second forwarding path, to form the forwarding path.

Another aspect of this application provides a network device. The network device includes a processor, a network interface, and a memory. The memory may be configured to store program code, and the processor is configured to invoke a program instruction in the memory, to perform the method in the foregoing aspects and designs. For specific execution steps, refer to the foregoing aspects, and details are not described herein again.

Another aspect of this application provides a computer storage medium, configured to store a computer software instruction used by the foregoing network device. The computer software instruction includes a program designed for executing the foregoing aspects.

DESCRIPTION OF EMBODIMENTS

The following describes in detail the embodiments of the application with reference to the accompanying drawings.

Figure 1:
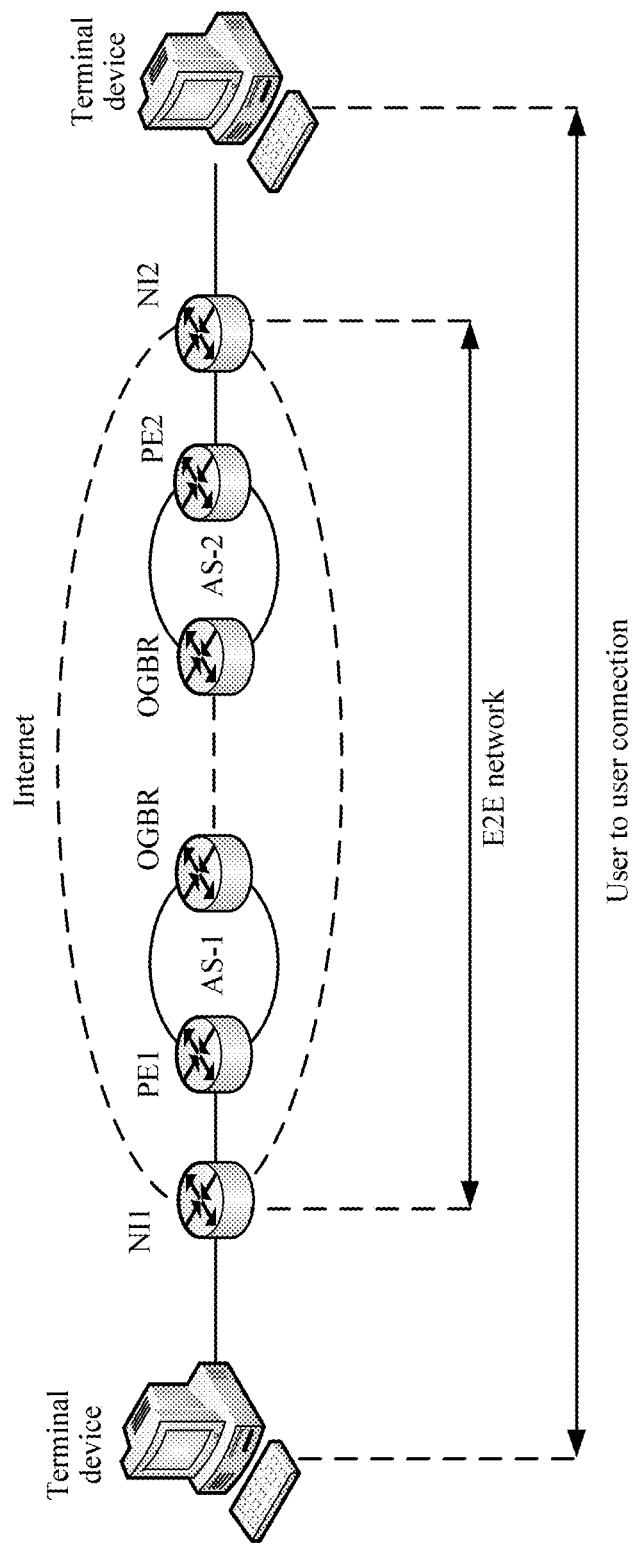
FIG. 1 is a schematic structural diagram of an end to end network.|[MS2]
Figure 2:
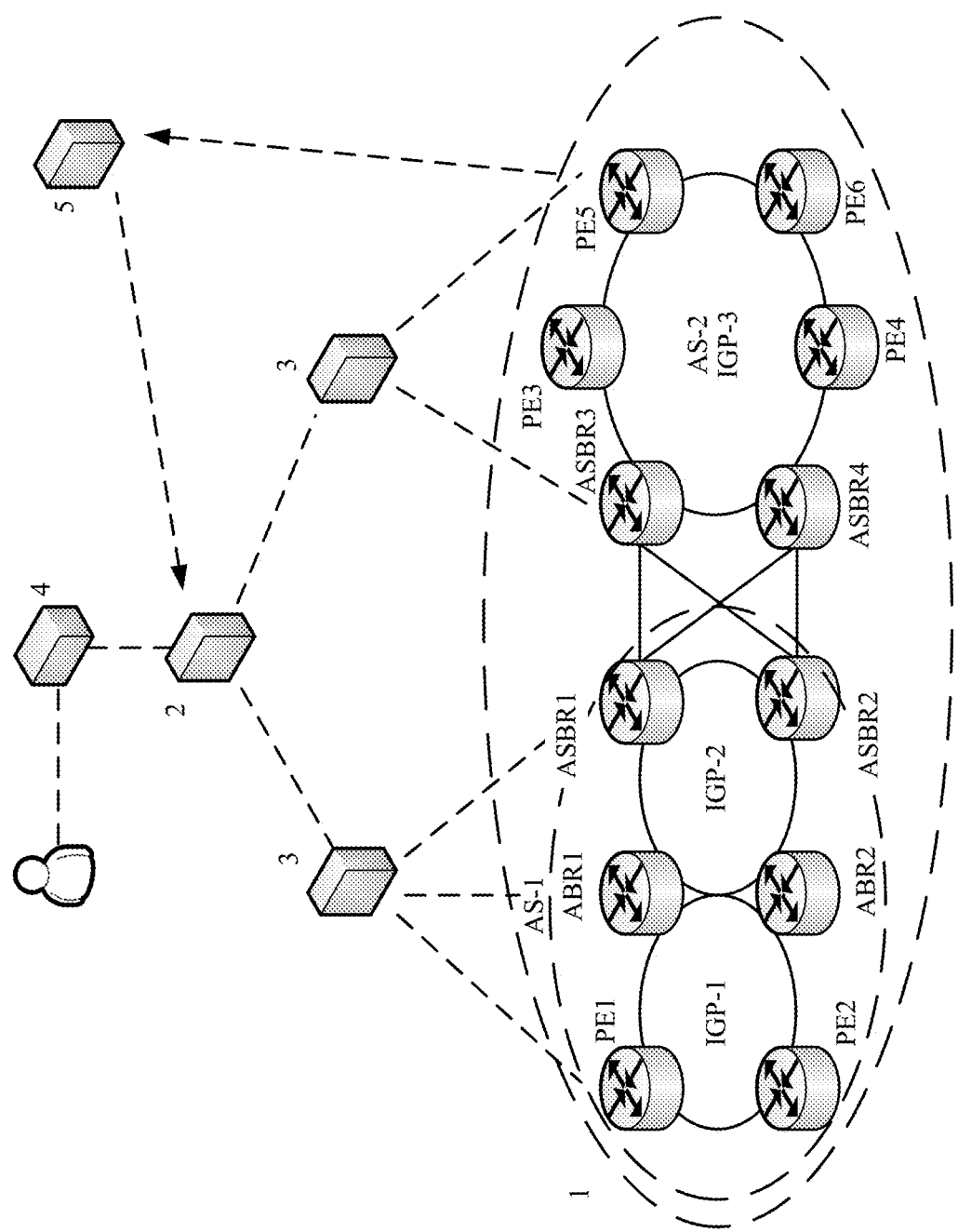
FIG. 2 is a schematic diagram of a network scenario to which a method for establishing a forwarding path is applied, in accordance with one or more embodiments.

FIG. 2 is a schematic diagram of a network scenario to which a method for establishing a forwarding path is applied according to an embodiment of this application. FIG. 2 shows a network system including a physical network 1, a super controller 2, single-domain controllers 3, an orchestrator 4, and Utraffic 5. The orchestrator is configured to: deliver an E2E service, and present an interface. Functions of the SC 2 include: E2E service decomposition: decomposing the E2E service into single-domain configuration models; network resource management: managing a Route-Distinguisher (RD), Route-Target (RT), Password-Identification (PR-ID), and the like; topology management: managing a full mesh topology, an L3 topology, and a service topology status; and tunnel management: planning and managing an E2E Label Switched Path (LSP). Functions of the DC include: network element management: discovering a physical network element, obtaining inventory information, and the like; network element resource management: managing a network element resource; topology management: intra-domain physical topology discovery, intra-domain L3 topology discovery, status update, and the like; tunnel management: intra-domain TE tunnel management; and path calculation: intra-domain TE path calculation. The Utraffic 5 is configured to perform traffic monitoring, delivery, and optimization.

The following specifically describes a prior-art technical problem with reference to an example.

Currently, a Latency On Demand (LOD) of a Software Defined Network (SDN) cross-domain service does not support deployment of a service having an E2E latency restriction. It is assumed that a user needs to deploy, in a network crossing two AS domains in FIG. 2, a Virtual Private LAN Service (VPLS) private line service that is from an AS-1 to an AS-2 and that has a latency requirement of 10 ms. [MS3] Conventionally, $\frac{2}{3}$ of an entire end to end performance indicator is distributed to internal networks of the autonomous systems, and $\frac{1}{3}$ of the entire end to end performance indicator is distributed to connection links.

Then, a formula for calculating a performance indicator distributed to each operator network is:

Performance indicator of a single operator network=End to end performance indicator*$(\frac{2}{3}+\frac{1}{3}*0.35)*\frac{1}{2}$.

A formula for calculating a performance indicator distributed to an inter-network interconnection link is:

Performance indicator of an inter-network interconnection link=End to end performance indicator*⅓*0.65.

A specific status of a network is not considered in the foregoing distribution method. For example, a domain AS-1 is a relatively small network, and a domain AS-2 is a network having a relatively large scale. However, according to the foregoing distribution method, a same latency performance indicator is distributed to different AS domains. The distribution method is apparently inappropriate and static, and online adjustment cannot be performed based on a service and a network status. To resolve the foregoing technical problem, the embodiments of this application provide a method for establishing a forwarding path in a network.

Figure 3:
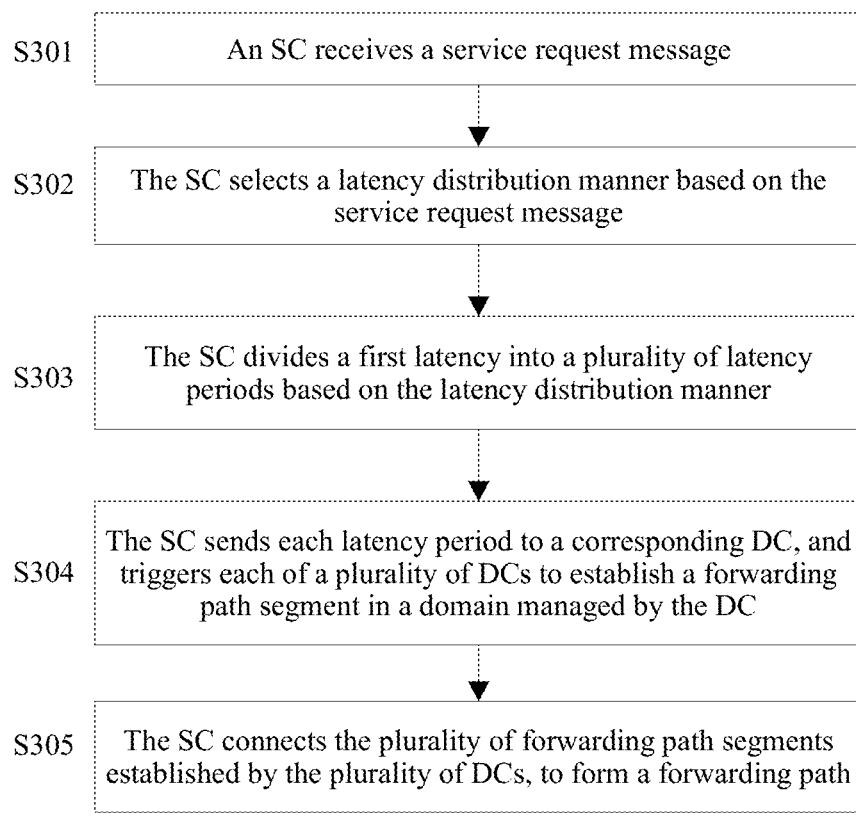
FIG. 3 is a flowchart of a method for establishing a forwarding path, in accordance with one or more embodiments.

To clearly describe the embodiments of the application, the following describes, by using a physical network including three domains an example, a process of a method in which an SDN cross-domain network supports deployment of a VPN service having an E2E latency restriction. FIG. 3 is a flowchart of a method for establishing a forwarding path in a network according to one or more embodiments of the application.

As shown in FIG. 3, the method includes:

S301. An SC receives a service request message, where the service request message includes a service type and a first latency, the service request message is used to request the SC to establish, in the network, a forwarding path used to transmit a service corresponding to the service type, and a latency of the forwarding path is less than or equal to the first latency.

S302. The SC selects a latency distribution manner based on the service request message.

S303. The SC divides the first latency into a plurality of latency periods based on the latency distribution manner, where the plurality of latency periods are in a one-to-one correspondence to a plurality of DCs.

S304. The SC sends each of the plurality of latency periods to a DC corresponding to the latency period, and triggers each of the plurality of DCs to establish a forwarding path segment in a domain managed by the DC, where a latency of each forwarding path segment is less than or equal to a latency period corresponding to the DC.

S305. The SC connects the plurality of forwarding path segments established by the plurality of DCs, to form the forwarding path.

The SC may connect the plurality of forwarding path segments to form the forwarding path in the following manner: connecting LSPs in the domains in an LSP stitching manner, to form an entire forwarding path.

In some embodiments, when a difference between quantities of network nodes in the domains managed by the plurality of DCs is in a predetermined range, the latency distribution manner selected by the SC is an ALRD manner, and the dividing, by the SC, the first latency into a plurality of latency periods based on the ALRD manner includes:

equally dividing, by the SC, the first latency into the plurality of latency periods based on a quantity of the forwarding path segments.

In some embodiments, when a service identified by the service type is a latency-sensitive service, the latency distribution manner selected by the SC is an MIRD manner, and the dividing, by the SC, the first latency into a plurality of latency periods based on the MIRD manner includes:

obtaining, by the SC, a second latency of a path having a minimum latency in paths in the domain managed by each of the plurality of DCs; and dividing, by the SC, the first latency into the plurality of latency periods based on a ratio between the obtained plurality of second latencies.

In some embodiments, when a service identified by the service type is a latency-insensitive service, the latency distribution manner selected by the SC is an MARD manner, and the dividing, by the SC, the first latency into a plurality of latency periods based on the MARD manner includes:

obtaining, by the SC, a third latency of a path having a maximum latency in paths in the domain managed by each of the plurality of DCs; and dividing, by the SC, the first latency into the plurality of latency periods based on a ratio between the obtained plurality of third latencies.

In some embodiments, when a service identified by the service type is a service in which a size of a to-be-transmitted file exceeds a preset value, the latency distribution manner selected by the SC is an AFRD manner, and the dividing, by the SC, the first latency into a plurality of latency periods based on the AFRD manner includes:

obtaining, by the SC, a fiber utilization rate in the domain managed by each of the plurality of DCs; and dividing, by the SC, the first latency into the plurality of latency periods based on a ratio between the obtained plurality of fiber utilization rates.

In some embodiments, when a service identified by the service type is a big data service, the latency distribution manner selected by the SC is a BORD manner, and the dividing, by the SC, the first latency into a plurality of latency periods based on the BORD manner includes:

obtaining, by the SC, traffic in the domain managed by each of the plurality of DCs, and calculating, based on the obtained traffic, a percentage of the traffic of each DC in a total bandwidth of the DC; and dividing, by the SC, the first latency into the plurality of latency periods based on a ratio between the percentages of the traffic of the plurality of the DCs in the total bandwidths of the DCs.

Figure 4:
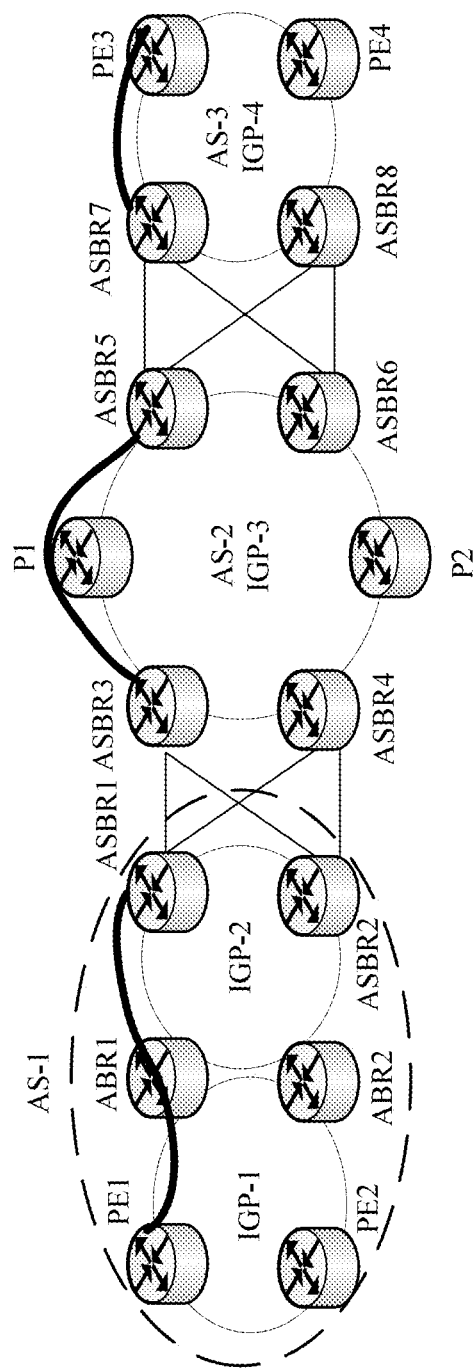
FIG. 4 is a schematic diagram of a scenario to which a method for establishing a forwarding path is applied, in accordance with one or more embodiments.
Figure 5:
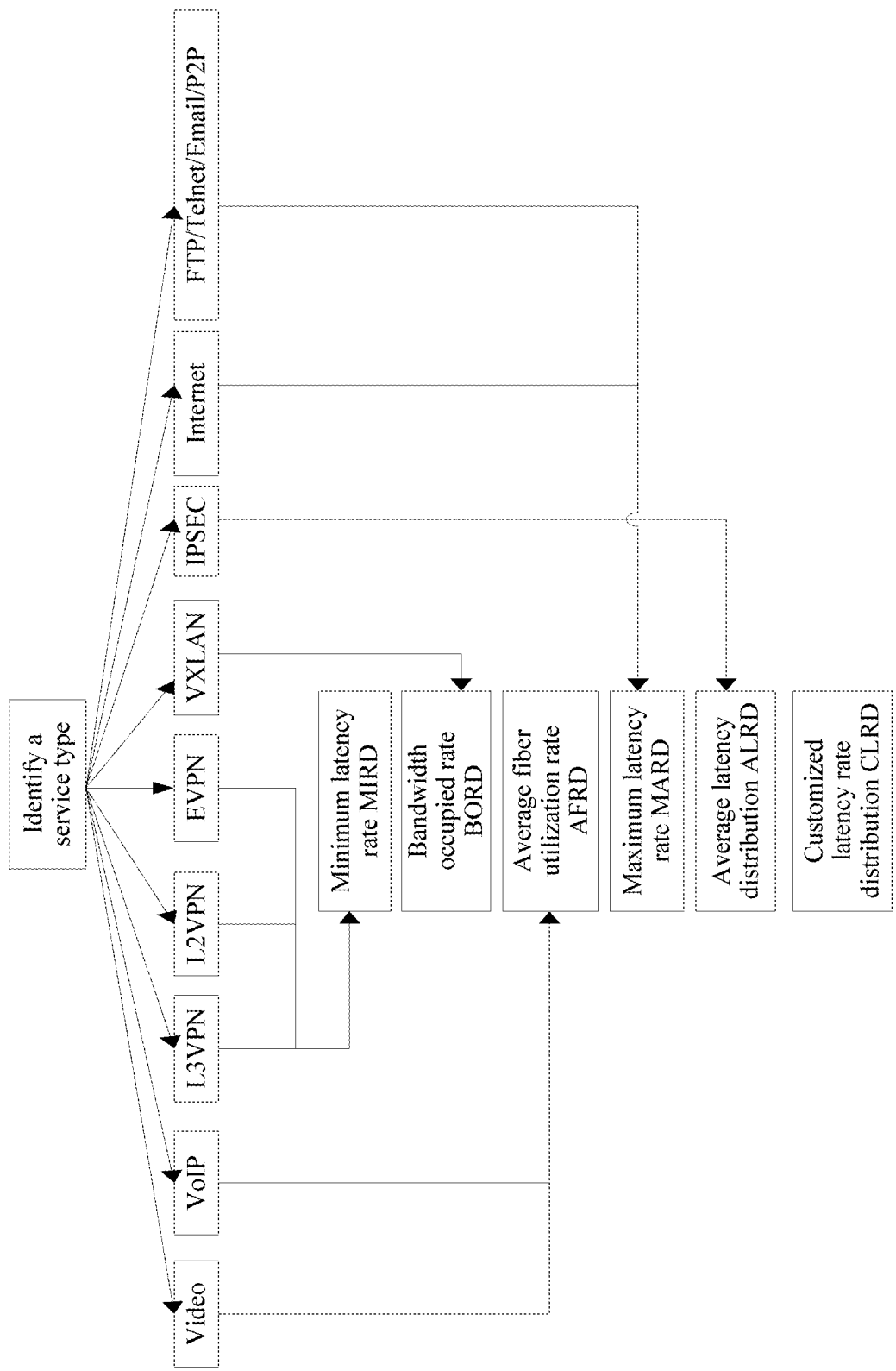
FIG. 5 is a schematic diagram of latency distribution methods corresponding to different service types, in accordance with one or more embodiments.

The following describes in detail, with reference to FIG. 4 and FIG. 5, the method for establishing a forwarding path, in accordance with one or more embodiments.

As shown in FIG. 4, an entire network includes an SC, three DCs, and three AS domains (the SC and the DCs are not shown) respectively managed by the three DCs, and information about each domain is shown in Table 1.

TABLE 1

| Domain name | AS number | Node scale | Node latency (ms) |
| --- | --- | --- | --- |
| Domain1 | As-1 | Nd1 | $T_{node}$ |
| Domain2 | As-2 | Nd2 | $T_{node}$ |
| Domain3 | As-3 | Nd3 | $T_{node}$ |

It may be obtained through calculation based on the foregoing information that a latency of each link is equal to $$\sum_{i=1}^{n} \text{Node}_i + \sum_{i=1}^{n} \text{Link}_i.$$

For example:

$Td1$=Node($pe1$)+node($abr1$)+node($asbr1$)+link($pe1abr1$)+link($abr1asbr1$)

$Td2$=Node($pe1$)+node($abr1$)+node($abr2$)+node($asbr2$)+node($asbr1$)+link($pe1abr1$)+link($abr1$-$abr2$)+link($abr2$-$asbr2$)+link($asbr2$-$asbr1$)

Table 2 shows a link latency attribute of each domain obtained through calculation according to the foregoing formula.

TABLE 2

| Ingress | Path | | Delay (ms) | Egress | T (min) |
|---|---|---|---|---|---|
| AS1 | PE1 | | | ASBR1 | |
| | | PE1-ABR1-ASBR1 | Td1 | | ✓ |
| | | PE1-ABR1-ABR2-ASBR2-ASBR1 | Td2 | | |
| | | PE1-PE2-ABR2-ABR1-ASBR1 | Td3 | | |
| | | PE1-PE2-ABR2-ASBR2-ASBR1 | Td4 | | |
| | PE1 | | | ASBR2 | |
| | | PE1-ABR1-ABR2-ASBR2 | Td5 | | |
| | | PE1-ABR1-ASBR1-ASBR2 | Td6 | | |
| | | PE1-PE2-ABR2-ASBR2 | Td7 | | |
| | | PE1-PE2-ABR2-ABR1-ASBR1-ASBR2 | Td8 | | |
| AS2 | ASBR3 | | | ASBR5 | |
| | | ASBR3-P1-ASBR5 | Td9 | | ✓ |
| | | ASBR3-ASBR4-P2-ASBR6-ASBR5 | Td10 | | |
| | ASBR3 | | | ASBR6 | |
| | | ASBR3-P1-ASBR5-ASBR6 | Td11 | | |
| | | ASBR3-ASBR4-P2-ASBR6 | Td12 | | |
| | ASBR4 | | | ASBR5 | |
| | | ASBR4-ASBR3-P1-ASBR5 | Td13 | | |
| | | ASBR4-P2-ASBR6-ASBR5 | Td14 | | |
| | ASBR4 | | | ASBR6 | |
| | | ASBR4-P2-ASBR6 | Td15 | | |
| | | ASBR4-ASBR3-P1-ASBR5-ASBR6 | Td16 | | |
| AS3 | ASBR7 | | | PE3 | |
| | | ASBR7-PE3 | Td17 | | ✓ |
| | | ASBR7-ASBR8-PE4-PE3 | Td18 | | |
| | ASBR8 | | | PE3 | |
| | | ASBR8-ASBR7-PE3 | Td19 | | |
| | | ASBR8-PE4-PE3 | Td20 | | |

The following provides descriptions by using an example in which an L3VPN service crossing three AS domains is deployed between a PE1 and a PE3, and a latency requirement is Tsvc. Steps of delivering the L3VPN service are as follows:

First, a northbound application (APP) delivers, by using a packet, a service having a latency restriction. A service packet is delivered to the SC through a restconf interface. After controlling a REST server to receive a northbound request, the SC forwards the northbound request to an L3 Service Management (SM) module, and the L3SM module transforms an Internet Engineering Task Force (IETF) model into a stable NetL3VPN model.

The NetL3vpn model on the SC parses a northbound packet, applies for network-level resources: an RD and an RT, and if the northbound packet carries "latency", extracts a service feature, and then invokes, based on the service feature, a POLICY module to obtain a latency distribution method.

Herein, the service feature may be extracted in the following two manners:

In a first manner, the SC may extract the service type based on an input parameter: path in the northbound packet. For example, "path=URL:http://{{url}}/restconf/config/etf-l3vpn-svc:l3vpn-svc/vpn-services", and therefore, it may be identified that the service type is of an L3VPN type.

In the other manner, preconfiguration may be performed by using a Website User Interface (WEBUI), so that when a service is delivered, the northbound APP may specify, as a specified service type, a service type that needs to be created.

According to the method for establishing a forwarding path in a network in this embodiment of the application, after the service type is identified, corresponding distribution methods need to be selected based on different service types. FIG. 5 is a schematic diagram of different latency distribution methods corresponding to different service types according to an embodiment of the application.

Descriptions and calculation formulas of various distribution methods are as follows:

(1) Average Latency Rate Distribution (Average Latency Rate Distribution, ALRD for Short)

$$T_i = \frac{T_{Total}}{D_{total}}$$

$T_i$ is a latency distributed to an $i^{th}$ domain, $T_{Total}$ is a total latency restriction of a tunnel, and $D_{Total}$ is a sum of autonomous systems of the tunnel.

If a user needs to create a private line service having a latency restriction of 10 ms in a network crossing three AS domains, a latency restriction of each AS domain is 3.3 ms based on an average latency rate distribution.

The distribution manner is applicable to a scenario in which network scales of autonomous systems which the tunnel crosses are equivalent, for example, a difference between quantities of network nodes is in a predetermined range such as 10%. When one core router is connected to two metropolitan area networks having equivalent scales, and a tunnel having a 10 ms latency needs to be created between the two metropolitan area networks, the distribution manner may be applied to a service such as an internet protocol security (Internet Protocol Security, IPSEC) service.

(2) Customized Latency Rate Distribution (CLRD)

Distribution is performed based on a latency rate specified by a user. If the user specifies 2:3:5, for a tunnel having a total latency of 10 ms, latencies distributed to the domains are respectively 2 ms, 3 ms, and 5 ms.

The distribution manner is generally a method in which a network administrator performs online latency distribution in real time with reference to network planning and latency planning of the network administrator and based on network load monitoring. If the network administrator finds, based on a network performance monitoring result, that a load of a domain is very high and a load of a domain is very low, the network administrator may manually adjust a latency distribution ratio to customize latency distribution.

(3) Minimum Latency Rate (MIRD) for the AS Domains $$T_{Min} = \text{Min}(\text{Delay}_j)$$

$T_{Min}$ is a value of a latency of a path having a minimum latency in all paths in a domain, and $\text{Delay}_j$ is a latency of a $j^{th}$ path.

If a ratio between minimum latencies of the AS domains is 1:2:2, for a tunnel having a total latency of 10 ms, latencies distributed to the domains are respectively 2 ms, 4 ms, and 4 ms.

In the distribution method, a lower iteration latency is distributed to a domain having a lower latency, and a higher iteration latency is distributed to a domain having a higher latency, so that latencies of both an underloaded network and an overloaded network are considered. The method is a relatively simple distribution manner, and a network load can be optimized. The distribution is applicable to services sensitive to a latency restriction, for example, an L3VPN service, an L2VPN service, and an EVPN service.

In a possible implementation, the latency-sensitive service specifically means that a latency of transmitting the service cannot be greater than a particular threshold, and the particular threshold may be specified by the user based on an actual status.

(4) Maximum Latency Rate Distribution (MARD) for the AS Domains $$T_{MAX} = \text{Max}(\text{Delay}_j)$$

$T_{MAX}$ is a value of a latency of a path having a maximum latency in all paths in a domain, and $\text{Delay}_j$ is a latency of a $j^{th}$ path.

If a ratio between maximum latencies of the AS domains is 15:10:15, for a tunnel having a total latency of 10 ms distributed to the domains are 4 ms, 2 ms, and 4 ms.

The method is a relatively flexible distribution manner, and a higher iteration latency is distributed to a domain having a higher maximum latency. In this way, there are a relatively large quantity of optional paths in the domain. The method is applicable to a service that is not highly sensitive to a latency, for example, an internet service, an FTP service, a telnet service, an email service, or a P2P service.

(5) Intra-Domain Average Fiber Utilization Rate Distribution (AFRD)

$$FUR_i = \sum_{j=1}^{m} \left( \frac{\text{Transmission traffic of the fiber}}{\text{Maximum bandwidth of the fiber}} \right)_j \Big/ m \times 100\%$$

m is a total quantity of fibers in a domain, and FUR, (fiber utilization rate) is an average fiber utilization rate of an $i^{th}$ domain.

If average fiber utilization rates of the domains are respectively 20%, 15%, and 15%, latencies distributed to the domains are respectively 4 ms, 3 ms, and 3 ms. A method for calculating an average fiber utilization rate is: (Transmission traffic of a fiber 1/Maximum bandwidth of the fiber 1+ . . . + Transmission traffic of a fiber n/Maximum bandwidth of the fiber n)/n*100%.

In the distribution manner, distribution is performed based on intra-domain bandwidth utilization, to improve intra-domain bandwidth utilization. This can be used to transmit a cross-domain service based on a large file, where the large file is a file whose size exceeds a preset value. For example, such a cross-domain service may be a cross-domain service used to transmit an image and/or voice, for example, a video (VIDEO) service or a voice over internet protocol (VoIP) service.

(6) Intra-Domain Bandwidth Occupied Rate Distribution (BORD)

$$BOR_i = \left( \sum_{j=1}^{m} \text{Flow}_j \right) \Big/ \left( \sum_{j=1}^{m} \text{BandWidth}_j \right) \times 100\%$$

m is a total quantity of links in a domain, $BOR_i$ (bandwidth occupied rate) is a bandwidth occupied rate of an $i^{th}$ domain, $\text{Flow}_j$ is transmission traffic of a $j^{th}$ link, and $\text{BandWidth}_j$ is a maximum physical bandwidth of the $j^{th}$ link.

If bandwidth occupied rates of the domains are respectively 10%, 30%, and 60%, latencies distributed to the domains are respectively 1 ms, 3 ms, and 6 ms. A method for calculating an intra-domain bandwidth occupied rate is: (Transmission traffic of a link 1+ . . . + Transmission traffic of a link n)/(Maximum bandwidth of the link 1+ . . . + Maximum bandwidth of the link n)*100%.

In the distribution manner, a domain is considered as a black box, and a ratio of total transmission traffic to a total capacity is similar to the "intra-domain average fiber utilization rate", and the distribution manner is a method of performing distribution based on network bandwidth utilization. Therefore, for a common data service especially a cross-domain big data (Big Data) service, for example, a VXLAN service, the distribution manner is better than the distribution manner based on the "intra-domain average fiber utilization rate".

The method based on the average fiber utilization rate and the method based on the bandwidth occupied rate can reflect link utilization in a domain, and the two methods can ensure better network utilization during service path iteration.

FIG. 5 is a diagram of correspondences between latency distribution methods and specific service types, in accordance with one or more embodiments. It can be learned from FIG. 5 that for an L3VPN service in this embodiment, a distribution method based on a "minimum latency rate" needs to be selected. It can be obtained based on the calculation formula of the foregoing distribution method based on a minimum latency rate that $T_{min}$ is equal to Td1 ms in a first domain, $T_{min}$ is equal to Td9 ms in a second domain, and $T_{min}$ is equal to Td17 ms in a third domain.

Therefore, iteration latency restrictions of the domains can be obtained through calculation. In this embodiment, a required latency Tsvc is distributed based on a ratio of Td1:Td9:Td17. Therefore, latencies distributed to the domains are respectively Tsvc*Td1/(Td1+Td9+Td17), Tsvc*Td9/(Td1+Td9+Td17), and Tsvc*Td17/(Td1+Td9+Td17).

After the step of distributing the latency restrictions to the domains based on the selected distribution method is performed, a communication link is established. Specifically, the NetL3vpn model the SC segments a model service at a granularity of DC, decomposes the model service into domain-level network data, and delivers the network data to the DC.

Correspondingly, each DC receives the network data from the SC, invokes an SNC component, and dynamically creates a TE tunnel as an L3VPN bearer tunnel based on a latency requirement restriction, that is, creates a forwarding path whose latency is less than or equal to a distributed latency period. For a first domain, a TE (Traffic Engineering, traffic engineering) tunnel is dynamically created based on a latency restriction of Tsvc*Td1/(Td1+Td9+Td17) ms; for a second domain, a TE tunnel is dynamically created based on a latency restriction of Tsvc*Td9/(Td1+Td9+Td17) ms; and for a third domain, a TE tunnel is dynamically created based on a latency restriction of Tsvc*Td17/(Td1+Td9+Td17) ms.

After the TE tunnel is created, the DC sends information about the TE tunnel to the SC, and triggers the SC to perform LSP stitching, to connect TE tunnels in the domains to form an entire forwarding path.

In this embodiment, although latency restrictions during tunnel iteration are respectively Tsvc*Td1/(Td1+Td9+Td17) ms, Tsvc*Td9/(Td1+Td9+Td17) ms, and Tsvc*Td17/(Td1+Td9+Td17) ms, a latency of a tunnel actually obtained through iteration conforms to a principle of preferentially selecting a minimum latency. It should be noted that the tunnel obtained through iteration herein is a bidirectional co-routed tunnel.

Finally, tunnels obtained through iteration in the three domains are shown by thick solid lines in FIG. 4.

Figure 6A:
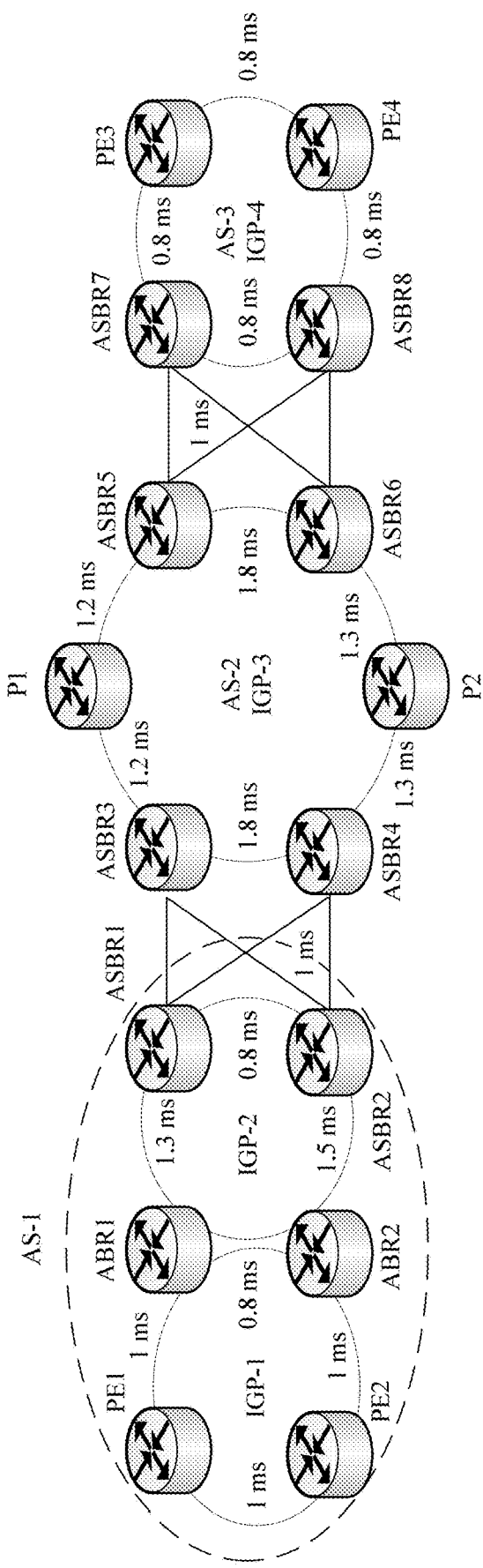
FIG. 6A is a schematic diagram of a scenario to which a method for establishing a forwarding path is applied, in accordance with one or more embodiments.

The following describes the method in the first embodiment of the application with reference to FIG. 6A and by using actual parameters as an example.

FIG. 6A shows a physical network that is the same as that in FIG. 4 and that includes three AS domains. Information about the domains is shown in Table 3.

TABLE 3

| Domain name | AS number | Node scale | Node latency (ms) |
|---|---|---|---|
| Domain1 | 100 | 6 | 0.05 |
| Domain2 | 200 | 6 | 0.05 |
| Domain3 | 300 | 4 | 0.05 |

In addition, link latencies of the domains in Table 4 may be obtained through calculation based on the latency values in FIG. 6A.

TABLE 4

| Ingress | Path | | Delay (ms) | Egress | T (min) |
|---|---|---|---|---|---|
| AS1 | PE1 | | | ASBR1 | |
| | | PE1-ABR1-ASBR1 | 2.45 | | ✓ |
| | | PE1-ABR1-ABR2-ASBR2-ASBR1 | 4.35 | | |
| | | PE1-PE2-ABR2-ABR1-ASBR1 | 4.4 | | |
| | | PE1-PE2-ABR2-ASBR2-ASBR1 | 4.6 | | |
| | PE1 | | | ASBR2 | |
| | | PE1-ABR1-ABR2-ASBR2 | 3.5 | | |
| | | PE1-ABR1-ASBR1-ASBR2 | 3.3 | | |
| | | PE1-PE2-ABR2-ASBR2 | 3.7 | | |
| | | PE1-PE2-ABR2-ABR1-ASBR1-ASBR2 | 5.15 | | |
| AS2 | ASBR3 | | | ASBR5 | |
| | | ASBR3-P1-ASBR5 | 2.55 | | ✓ |
| | | ASBR3-ASBR4-P2-ASBR6-ASBR5 | 6.45 | | |
| | ASBR3 | | | ASBR6 | |
| | | ASBR3-P1-ASBR5-ASBR6 | 4.4 | | |
| | | ASBR3-ASBR4-P2-ASBR6 | 4.6 | | |
| | ASBR4 | | | ASBR5 | |
| | | ASBR4-ASBR3-P1-ASBR5 | 4.45 | | |
| | | ASBR4-P2-ASBR6-ASBR5 | 4.6 | | |
| | ASBR4 | | | ASBR6 | |
| | | ASBR4-P2-ASBR6 | 2.75 | | |
| | | ASBR4-ASBR3-P1-ASBR5-ASBR6 | 6.25 | | |
| AS3 | ASBR7 | | | PE3 | |
| | | ASBR7-PE3 | 0.9 | | ✓ |
| | | ASBR7-ASBR8-PE4-PE3 | 2.6 | | |
| | ASBR8 | | | PE3 | |
| | | ASBR8-ASBR7-PE3 | 1.75 | | |
| | | ASBR8-PE4-PE3 | 1.75 | | |

Similarly, that an L3VPN service crossing three AS domains is deployed between a PE1 and a PE3 is used as an example, and a latency requirement is 20 ms. As described above, for the L3VPN service in this embodiment, minimum latencies of the domains are calculated by using the minimum latency rate distribution method, and are respectively 2.45 ms, 2.55 ms, and 0.9 ms. Latencies are distributed to the domains based on a ratio of 2.45:2.55:0.9, and the latencies distributed to the domains are respectively 8.3 ms, 8.7 ms, and 3 ms. Then, the SC sends the three latency periods to the corresponding DCs, and triggers the DCs to establish forwarding paths, that is, tunnels, in the domains managed by the DCs.

For a first domain, a TE tunnel is dynamically created based on a latency restriction of 8.3 ms; for a second domain, a TE tunnel is dynamically created based on a latency restriction of 8.7 ms; and for a third domain, a TE tunnel is dynamically created based on a latency restriction of 3 ms.

A tunnel restriction includes a latency restriction, and then, a tunnel is created in an exact matching manner. In other words, a tunnel iteration management module selects, based on a latency restriction condition, a path having an exactly matched latency requirement. If no path is found, a new tunnel meeting a latency requirement is created. If a tunnel having a latency restriction of 50 ms needs to be created, a PCE module calculates a path based on the restriction condition, and a latency of the path is a linear sum of latencies of nodes and links on the path. If a plurality of paths meet the latency requirement, one path whose accumulated latency is the lowest may be selected.

Figure 6B:
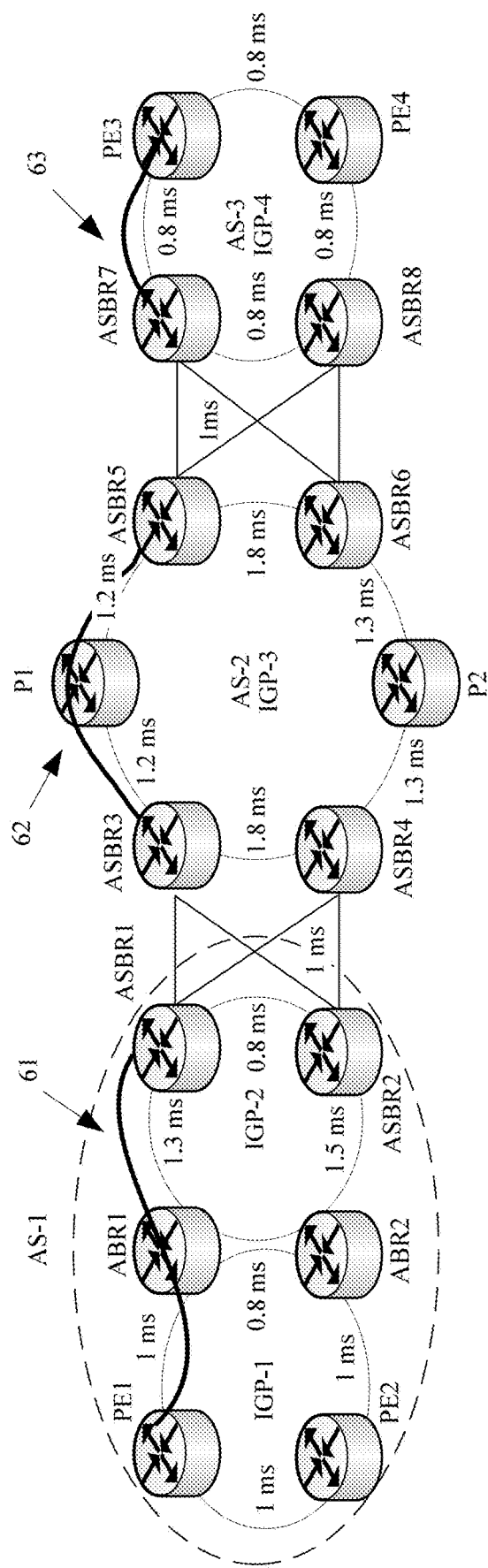
FIG. 6B is a schematic diagram of a scenario to which a method for establishing a forwarding path is applied, in accordance with one or more embodiments.

Finally, tunnels obtained through iteration in the three domains are shown by thick solid lines 61, 62, and 63 in FIG. 6B. Because latency restrictions of tunnel iteration are respectively 8.3 ms, 8.7 ms, and 3 ms, latencies of the forwarding paths created by the DCs need to be less than or equal to latency restriction periods distributed to the DCs. During actual use, a latency of a tunnel obtained through iteration may conform to a principle of preferentially selecting a minimum latency; and a latency of the finally created tunnel 61 is 2.45 ms, a latency of the tunnel 62 is 2.55 ms, and a latency of the tunnel 63 is 0.9 ms.

Based on the foregoing embodiments, the application further provides another method for establishing a forwarding path in a network, where the network includes the SC and the plurality of DCs.

The method includes: receiving, by the DC, a latency period sent by the SC, where the latency period is obtained by the SC after the SC selects a latency distribution manner based on a service request message and then divides a first latency in the service request message;

establishing, by the DC, a forwarding path segment in a domain, where a latency of the forwarding path segment is less than or equal to the latency period; and sending, by the DC, information about the forwarding path segment to the SC, and triggering the SC to connect the plurality of forwarding path segments, to form the forwarding path.

Further, according to the method in the first embodiment of the application, a network may be monitored to determine whether a latency distributed to each domain meets a service requirement.

If a latency distributed to a domain does not meet the service requirement, user input is introduced to modify a latency parameter, and then, latency restrictions are re-distributed to the domains; or if the latency distributed to each domain meets the service requirement, the current latency restrictions of the domains are maintained.

The method provided in this embodiment of the application supports an online user modification function. When a service latency does not meet a service requirement, user input may be introduced to modify a value of a latency parameter online. After the latency parameter is updated, the controller performs iteration in the domain based on a new latency, to obtain a tunnel meeting the latency restriction, and after iteration succeeds, a VPN service is switched to a new path.

As shown in FIG. 2, a user monitors a performance indicator of a network such as link utilization, a latency, jitter, or a packet loss rate by using Utraffic 5, compares the performance indicator and an expected performance indicator, and then adjusts a latency distribution method. The DC obtains real-time network performance data such as a single-domain average fiber utilization rate, a single-domain bandwidth occupied rate, a link latency, or a node latency by using an interface provided by the Utraffic 5. Therefore, the user monitors a latency indicator of an E2E service by using the Utraffic 5, and when finding that the latency indicator does not meet a service requirement, may trigger the controller to dynamically modify a latency of a link online, trigger re-iteration of a service path, and re-identify and distribute latencies to the domains, so that a service traffic path is adjusted to a better path. In addition, after it is found through monitoring that the service latency indicator does not meet the service requirement, as another option, online user input may be introduced. The user may modify a service latency parameter online, and manually customized latency restriction modification is introduced, so that network optimization can better meet a customer requirement.

Latency attributes of a node and a link in conventional networks are static configurations. A method based on a preset latency has high timeliness. Network performance data such as a minimum latency, a maximum latency, a fiber utilization rate, a node latency, and a link latency may be obtained by using an interface provided by a monitor (for example, Utraffic), and node and link attributes of a controller are updated in real time or periodically. Therefore, this method can reflect a real status of a network in a period in real time.

Figure 7:
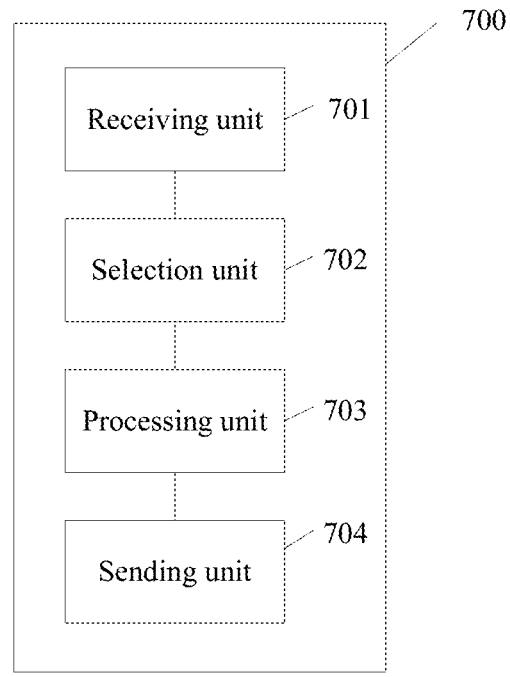
FIG. 7 is schematic structural diagram of a controller for establishing a forwarding path, in accordance with one or more embodiments.

Referring to FIG. 7, an embodiment of this application further provides an SC 700 for establishing a forwarding path in a network. As shown in FIG. 7, the SC includes:

a receiving unit 701, configured to receive a service request message, where the service request message includes a service type and a first latency, the service request message is used to request the SC to establish, in the network, a forwarding path used to transmit a service corresponding to the service type, and a latency of the forwarding path is less than or equal to the first latency;

a selection unit 702, configured to select a latency distribution manner based on the service request message;

a processing unit 703, configured to divide the first latency into a plurality of latency periods based on the latency distribution manner, where the plurality of latency periods are in a one-to-one correspondence to the plurality of DCs; and a sending unit 704, configured to: send each of the plurality of latency periods to a DC corresponding to the latency period, and trigger each of the plurality of DCs to establish a forwarding path segment in a domain managed by the DC, where a latency of each forwarding path segment is less than or equal to a latency period corresponding to the DC, where the processing unit 703 is further configured to connect the plurality of forwarding path segments established by the plurality of DCs, to form the forwarding path.

Actions and functions implemented by the SC 700 are consistent with those in the method for establishing a forwarding path in the foregoing embodiment, and therefore, details are not described herein again.

The SC 700 in this embodiment of this application further includes:

a determining unit, configured to determine qualities of network nodes in the domains in which the forwarding path segments are established, where the selection unit is configured to: when the determining unit determines that a difference between the quantities of the network nodes in the domains in which the forwarding path segments are established is in a predetermined range, select an ALRD manner as the latency distribution manner; and that the processing unit divides the first latency into a plurality of latency periods based on the latency distribution manner includes:

equally dividing, by the processing unit, the first latency into the plurality of latency periods based on a quantity of the plurality of latency periods.

The SC 700 in this embodiment of this application further includes:

a determining unit, configured to determine whether a service identified by the service type is a latency-sensitive service, where the selection unit is configured to: when the determining unit determines that the service identified by the service type is a latency-sensitive service, select a MIRD manner as the latency distribution manner; and that the processing unit divides the first latency into a plurality of latency periods based on the MIRD manner includes:

obtaining, by the processing unit, a second latency of a path having a minimum latency in paths in the domain managed by each of the plurality of DCs; and that the processing unit divides the first latency into the plurality of latency periods based on a ratio between the obtained plurality of second latencies.

The SC 700 in this embodiment of this application further includes:

a determining unit, configured to determine whether a service identified by the service type is a latency-insensitive service, where the selection unit is configured to: when the determining unit determines that the service identified by the service type is a latency-insensitive service, select an MARD manner as the latency distribution manner; and that the processing unit divides the first latency into a plurality of latency periods based on the MARD manner includes:

obtaining, by the processing unit, a third latency of a path having a maximum latency in paths in the domain managed by each of the plurality of DCs; and dividing, by the processing unit, the first latency into the plurality of latency periods based on a ratio between the obtained plurality of third latencies.

The SC 700 in this embodiment of this application further includes:

a determining unit, configured to determine whether a service identified by the service type is a service in which a size of a to-be-transmitted file exceeds a preset value, where the selection unit is configured to: when the determining unit determines that the service identified by the service type is a service in which a size of a to-be-transmitted file exceeds the preset value, select an AFRD manner as the latency distribution manner; and that the processing unit divides the first latency into a plurality of latency periods based on the AFRD manner includes:

obtaining, by the processing unit, a fiber utilization rate in the domain managed by each of the plurality of DCs; and dividing, by the processing unit, the first latency into the plurality of latency periods based on a ratio between the obtained plurality of fiber utilization rates.

The SC 700 in this embodiment of this application further includes:

a determining unit, configured to determine whether a service identified by the service type is a big data service, where the selection unit is configured to: when the determining unit determines that the service identified by the service type is a big data service, select a BORD manner as the latency distribution manner; and that the processing unit divides the first latency into a plurality of latency periods based on the BORD manner includes:

obtaining, by the processing unit, traffic in the domain managed by each of the plurality of DCs, and calculating, based on the obtained traffic, a percentage of the traffic of each DC in a total bandwidth of the DC; and dividing, by the processing unit, the first latency into the plurality of latency periods based on a ratio between the percentages of the traffic of the plurality of the DCs in the total bandwidths of the DCs.

According to the SC 700 in this embodiment of this application, the latency distribution manner selected by the selection unit is a customized latency rate distribution manner, and the processing unit divides the first latency into the plurality of latency periods based on a ratio specified by a user.

Figure 8:
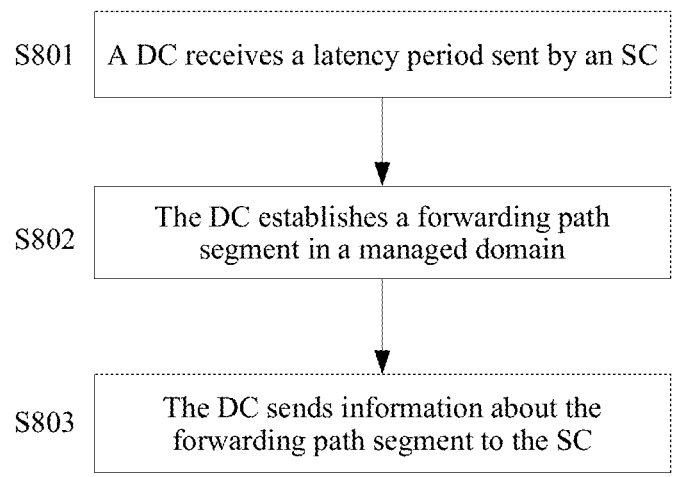
FIG. 8 is a flowchart of a method for establishing a forwarding path, in accordance with one or more embodiments.

An embodiment of the application further provides another method for establishing a forwarding path in a network. The network includes a super controller SC and a plurality of domain controllers DCs, the SC manages the plurality of DCs, and each of the plurality of DCs manages one domain. As shown in FIG. 8, the method includes:

S801. The DC receives a latency period sent by the SC, where the latency period is obtained by the SC after the SC selects a latency distribution manner based on a service request message and then divides a first latency in the service request message.

S802. The DC establishes a forwarding path segment in a managed domain, where a latency of the forwarding path segment is less than or equal to the latency period.

S803. The DC sends information about the forwarding path segment to the SC, and triggers the SC to connect the plurality of forwarding path segments established by the plurality of DCs, to form the forwarding path.

In some embodiments, when a difference between quantities of network nodes in the domains managed by the plurality of DCs is in a predetermined range, the latency distribution manner selected by the SC is an ALRD manner, and the dividing, by the SC, the first latency based on the ALRD manner, to obtain the latency period includes:

equally dividing, by the SC, the first latency based on a quantity of the DCs, to obtain the latency period.

In some embodiments, when a service identified by the service type is a latency-sensitive service, the latency distribution manner selected by the SC is an MIRD manner, and the dividing, by the SC, the first latency based on the MIRD manner, to obtain the latency period includes:

obtaining, by the SC, a second latency of a path having a minimum latency in paths in the domain managed by each of the plurality of DCs; and dividing, by the SC, the first latency based on a ratio between the obtained plurality of second latencies, to obtain the latency period.

In some embodiments, when a service identified by the service type is a latency-insensitive service, the latency distribution manner selected by the SC is an MARD manner, and the dividing, by the SC, the first latency based on the MARD manner, to obtain the latency period includes:

obtaining, by the SC, a third latency of a path having a maximum latency in paths in the domain managed by each of the plurality of DCs; and dividing, by the SC, the first latency based on a ratio between the obtained plurality of third latencies, to obtain the latency period.

In some embodiments, when a service identified by the service type is a service in which a size of a to-be-transmitted file exceeds a preset value, the latency distribution manner selected by the SC is an AFRD manner, and the dividing, by the SC, the first latency based on the AFRD manner, to obtain the latency period includes:

obtaining, by the SC, a fiber utilization rate in the domain managed by each of the plurality of DCs; and dividing, by the SC, the first latency based on a ratio between the obtained plurality of fiber utilization rates, to obtain the latency period.

In some embodiments, when a service identified by the service type is a big data service, the latency distribution manner selected by the SC is a BORD manner, and the dividing, by the SC, the first latency based on the BORD manner, to obtain the latency period includes:

obtaining, by the SC, traffic in the domain managed by each of the plurality of DCs, and calculating, based on the obtained traffic, a percentage of the traffic of each DC in a total bandwidth of the DC; and dividing, by the SC, the first latency based on a ratio between the percentages of the traffic of the plurality of the DCs in the total bandwidths of the DCs, to obtain the latency period.

In some embodiments, the latency distribution calculation manner selected by the SC is a customized latency rate distribution manner, and the SC divides the first latency based on a ratio specified by a user, to obtain a latency period.

Figure 9:
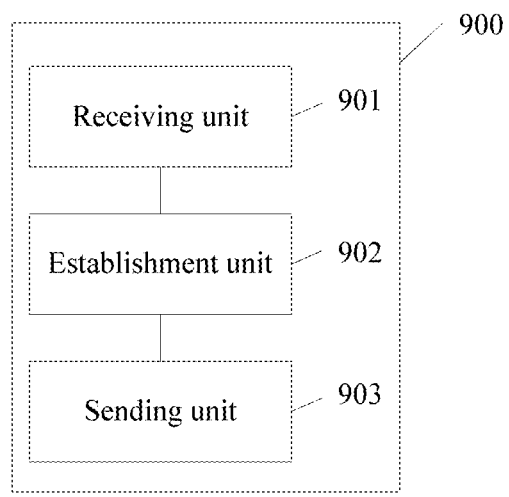
FIG. 9 is schematic structural diagram of a controller for establishing a forwarding path, in accordance with one or more embodiments.

An embodiment of this application further provides a domain controller DC for establishing a forwarding path in a network, where the network includes a super controller SC and a plurality of DCs, the SC manages the plurality of DCs, and each of the plurality of DCs manages one domain. As shown in FIG. 9, the DC 900 includes:

a receiving unit 901, configured to receive a latency period sent by the SC, where the latency period is obtained by the SC after the SC selects a latency distribution manner based on a service request message and then divides a first latency in the service request message;

an establishment unit 902, configured to establish a forwarding path segment in the domain, where a latency of the forwarding path segment is less than or equal to the latency period; and a sending unit 903, configured to: send information about the forwarding path segment to the SC, and trigger the SC to connect the plurality of forwarding path segments established by the establishment units, to form the forwarding path.

Actions and functions implemented by the DC 900 are consistent with those in the method for establishing a forwarding path in the foregoing embodiment, and therefore, details are not described herein again.

An embodiment of the application further provides a network system 1000 for establishing a forwarding path.

Figure 10:
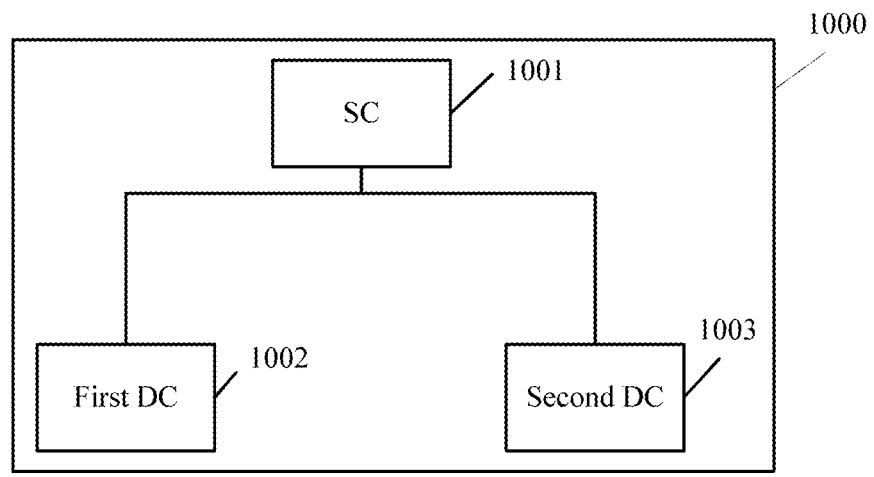
FIG. 10 is schematic structural diagram of a network system for establishing a forwarding path, in accordance with one or more embodiments.

As shown in FIG. 10, the system 1000 includes an SC 1001, a first DC 1002, and a second DC 1003. The SC 1001 manages the first DC 1002 and the second DC 1003, and each of the first DC 1002 and the second DC 1003 manages one domain.

The SC 1001 is configured to: receive a service request message, where the service request message includes a service type and a first latency, the service request message is used to request the SC 1001 to establish, in the network, a forwarding path used to transmit a service corresponding to the service type, and a latency of the forwarding path is less than or equal to the first latency; select a latency distribution manner based on the service request message; divide the first latency into a first latency period and a second latency period based on the latency distribution manner; send the first latency period to the first DC 1002; and send the second latency period to the second DC 1003.

The first DC 1002 is configured to: receive the first latency period sent by the SC 1001; establish, based on the first latency period, a first forwarding path segment in the domain managed by the first DC 1002, where a latency of the first forwarding path segment is less than or equal to the first latency period; and send information about the first forwarding path segment to the SC 1001.

The second DC 1003 is configured to: receive the second latency period sent by the SC 1001; establish, based on the second latency period, a second forwarding path segment in the domain managed by the second DC 1003, where a latency of the second forwarding path segment is less than or equal to the second latency period; and send information about the second forwarding path segment to the SC 1001.

The SC 1001 is further configured to connect the first forwarding path segment and the second forwarding path segment based on the information about the first forwarding path and the information about the second forwarding path, to form the forwarding path.

Actions and functions implemented by the SC 1001, the first DC 1002, and the second DC 1003 in the system 1000 are consistent with those in the method for establishing a forwarding path in the foregoing embodiment, and therefore, details are not described herein again.

Figure 11:
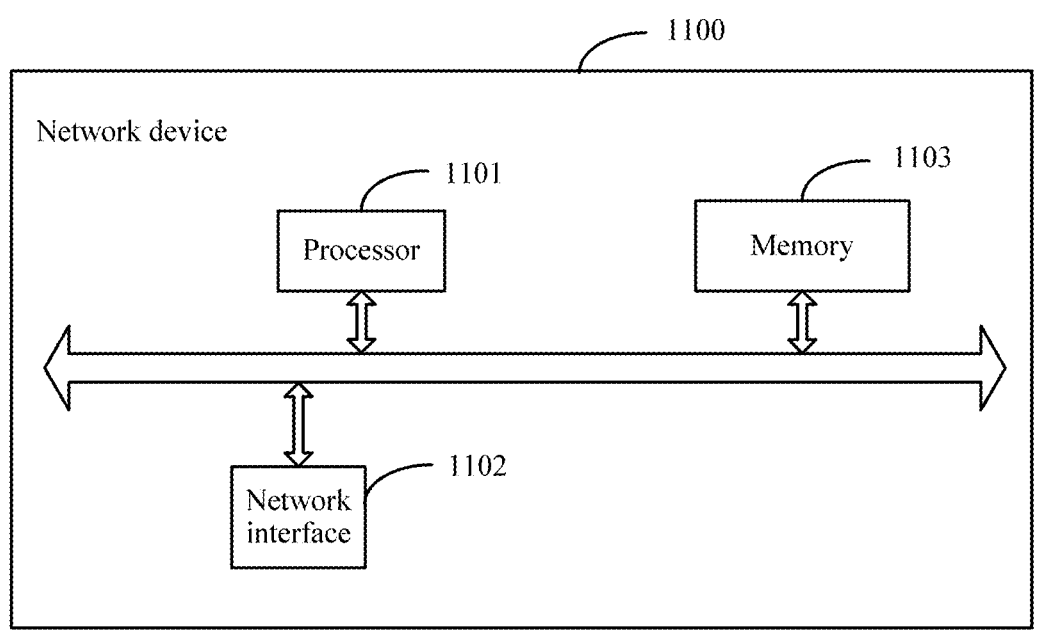
FIG. 11 is a schematic structural diagram of a network device, in accordance with one or more embodiments.

Referring to FIG. 11, an embodiment of this application further provides a network device. As shown in FIG. 11, the network device 1100 may perform the method shown in the foregoing embodiment.

The network device 1100 includes a processor 1101, a network interface 1102, and a memory 1103. The processor 1101 includes but is not limited to one or more of a central processing unit (CPU), a network processor (NP), an application-specific integrated circuit (ASIC), or a programmable logic device (PLD). The PLD may be a complex programmable logic device (CPLD), a field-programmable gate array (FPGA), or generic array logic (GAL).

The memory 1103 includes but is not limited to a content-addressable memory (CAM), for example, a ternary content-addressable memory (TCAM), or a random access memory (RAM).

The network interface 1102 may include a common physical interface, and the physical interface may be an Ethernet interface or an asynchronous transfer mode (ATM) interface. The processor 1101, the network interface 1102, and the memory 1103 may be integrated into one or more independent circuits or hardware, for example, an ASIC.

The memory 1103 may be configured to store program code and data of the network device 1100. The processor 1101 is configured to invoke a program instruction in the memory 1103, to perform the method in the embodiment shown in FIG. 3. For specific execution steps, refer to the foregoing embodiment, and details are not described herein again.

Some embodiments of the application provide a computer storage medium, configured to store a computer software instruction used by the foregoing network device, where the computer software instruction includes a program designed for performing the method for establishing a forwarding path. Persons skilled in the art may be aware that the computer-readable medium includes a computer storage medium and a communications medium, where the communications medium includes any medium that enables a computer program to be transmitted from one place to another. The storage medium may be any available medium accessible by a general-purpose or special-purpose computer. For example, the storage medium may be at least one of the following media: various media capable of storing program code, for example, a read-only memory (ROM), a RAM, a magnetic disk, or an optical disc.

According to the method and the controller that are provided in the embodiments of the application, a latency can be customized and intelligently matched, to resolve a technical problem that a latency restriction of a forwarding path cannot be distributed for different services. Although the foregoing embodiments are described based on a cross-domain VPN service, actually, the method and the controller in the application can be applied to another type of cross-domain service.

"First" in the first latency in the embodiments of the application is merely used to identify a name, and does not mean the first in sequence. The rule is also applicable to "second" and "third".

Persons skilled in the art should be aware that in the foregoing one or more examples, functions described in the application may be implemented by hardware, software, firmware, or any combination thereof. When the application is implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible by a general-purpose or special-purpose computer. For example, the storage medium may be at least one of the following media: various media capable of storing program code, for example, a ROM, a RAM, a magnetic disk, or an optical disc.

Finally, it should be noted that the foregoing embodiments are merely used for describing the technical solutions of this application, but not for limiting this application. Although this application and the beneficial effects of this application are described in detail with reference to the foregoing embodiments, persons of ordinary skill in the art should understand that they may still make modifications to the technical solutions described in the foregoing embodiments or make equivalent replacements to some technical features thereof.

What is claimed is:

1. A method for establishing a forwarding path in a network, wherein the network comprises a super controller (SC) and a plurality of domain controllers (DCs), the SC manages the plurality of DCs, each of the plurality of DCs manages one domain, and the method comprises:
   receiving, by the SC, a service request message, wherein the service request message comprises a service type and a first latency, the service request message is used to request the SC to establish, in the network, a forwarding path used to transmit a service corresponding to the service type, and a latency of the forwarding path is less than or equal to the first latency;
   selecting, by the SC, a latency distribution manner based on the service request message;
   dividing, by the SC, the first latency into a plurality of latency periods based on the latency distribution manner, wherein the plurality of latency periods are in a one-to-one correspondence to the plurality of DCs;
   sending, by the SC, each of the plurality of latency periods to a DC corresponding to the latency period, and triggering each of the plurality of DCs to establish a forwarding path segment in the domain managed by the DC, wherein a latency of each forwarding path segment is less than or equal to a latency period corresponding to the DC; and
   connecting, by the SC, the plurality of forwarding path segments established by the plurality of DCs, to form the forwarding path.

2. The method according to claim 1, wherein when a difference between quantities of network nodes in the domains managed by the plurality of DCs is in a predetermined range, the latency distribution manner selected by the SC is an average latency rate distribution (ALRD) manner, and the dividing, by the SC, the first latency into a plurality of latency periods based on the ALRD manner comprises:
   equally dividing, by the SC, the first latency into the plurality of latency periods based on a quantity of the DCs.

3. The method according to claim 1, wherein when a service identified by the service type is a latency-sensitive service, the latency distribution manner selected by the SC is a minimum latency rate distribution (MIRD) manner, and the dividing, by the SC, the first latency into a plurality of latency periods based on the MIRD manner comprises:
   obtaining, by the SC, a second latency of a path having a minimum latency in paths in the domain managed by each of the plurality of DCs; and
   dividing, by the SC, the first latency into the plurality of latency periods based on a ratio between the obtained plurality of second latencies.

4. The method according to claim 1, wherein when a service identified by the service type is a latency-insensitive service, the latency distribution manner selected by the SC is a maximum latency rate distribution (MARD) manner, and the dividing, by the SC, the first latency into a plurality of latency periods based on the MARD manner comprises:
   obtaining, by the SC, a third latency of a path having a maximum latency in paths in the domain managed by each of the plurality of DCs; and
   dividing, by the SC, the first latency into the plurality of latency periods based on a ratio between the obtained plurality of third latencies.

5. The method according to claim 1, wherein when a service identified by the service type is a service in which a size of a to-be-transmitted file exceeds a preset value, the latency distribution manner selected by the SC is an average fiber utilization rate distribution (AFRD) manner, and the dividing, by the SC, the first latency into a plurality of latency periods based on the AFRD manner comprises:
   obtaining, by the SC, a fiber utilization rate in the domain managed by each of the plurality of DCs; and
   dividing, by the SC, the first latency into the plurality of latency periods based on a ratio between the obtained plurality of fiber utilization rates.

6. The method according to claim 1, wherein when a service identified by the service type is a big data service, the latency distribution manner selected by the SC is a bandwidth occupied rate distribution (BORD) manner, and the dividing, by the SC, the first latency into a plurality of latency periods based on the BORD manner comprises:
   obtaining, by the SC, traffic in the domain managed by each of the plurality of DCs, and calculating, based on the obtained traffic, a percentage of the traffic of each DC in a total bandwidth of the DC; and
   dividing, by the SC, the first latency into the plurality of latency periods based on a ratio between the percentages of the traffic of the plurality of the DCs in the total bandwidths of the DCs.

7. A super controller (SC) for establishing a forwarding path in a network, wherein the network comprises the SC and a plurality of domain controllers (DCs), the SC manages the plurality of DCs, each of the plurality of DCs manages one domain, and the SC comprises:
a network interface; and
a processor coupled to the network interface,
wherein
the network interface is configured to receive a service request message,
the service request message comprises a service type and a first latency, the service request message is used to request the SC to establish, in the network, a forwarding path used to transmit a service corresponding to the service type, and a latency of the forwarding path is less than or equal to the first latency,
the processor is configured to:
select a latency distribution manner based on the service request message; and
divide the first latency into a plurality of latency periods based on the latency distribution manner, wherein the plurality of latency periods are in a one-to-one correspondence to the plurality of DCs,
the network interface is further configured to:
send each of the plurality of latency periods to a DC corresponding to the latency period; and
trigger each of the plurality of DCs to establish a forwarding path segment in the domain managed by the DC, wherein a latency of each forwarding path segment is less than or equal to a latency period corresponding to the DC, and
the processor is further configured to connect the plurality of forwarding path segments established by the plurality of DCs to form the forwarding path.

8. The SC according to claim 7, wherein the processor is further configured to:
determine qualities of network nodes in the domains in which the forwarding path segments are established;
select an average latency rate distribution (ALRD) manner as the latency distribution manner when the processor determines that a difference between the quantities of the network nodes in the domains in which the forwarding path segments are established is in a predetermined range; and
divide the first latency into a plurality of latency periods based on the latency distribution manner by equally dividing the first latency into the plurality of latency periods based on a quantity of the DCs.

9. The SC according to claim 7, wherein the processor is further configured to:
determine whether a service identified by the service type is a latency-sensitive service;
select a minimum latency rate distribution (MIRD) manner as the latency distribution manner when the processor determines that the service identified by the service type is a latency-sensitive service;
obtain a second latency of a path having a minimum latency in paths in the domain managed by each of the plurality of DCs; and
divide the first latency into the plurality of latency periods based on a ratio between the obtained plurality of second latencies.

10. The SC according to claim 7, wherein the processor is further configured to:
determine whether a service identified by the service type is a latency-insensitive service;
select a maximum latency rate distribution (MARD) manner as the latency distribution manner when the processor determines that the service identified by the service type is a latency-insensitive service;
obtain a third latency of a path having a maximum latency in paths in the domain managed by each of the plurality of DCs; and
divide the first latency into the plurality of latency periods based on a ratio between the obtained plurality of third latencies.

11. The SC according to claim 7, wherein the processor is further configured to:
determine whether a service identified by the service type is a service in which a size of a to-be-transmitted file exceeds a preset value;
select an average fiber utilization rate distribution (AFRD) manner as the latency distribution manner when the processor determines that the service identified by the service type is a service in which a size of a to-be-transmitted file exceeds the preset value; and
divide the first latency into a plurality of latency periods based on the AFRD manner by obtaining a fiber utilization rate in the domain managed by each of the plurality of DCs and dividing the first latency into the plurality of latency periods based on a ratio between the obtained plurality of fiber utilization rates.

12. The SC according to claim 7, wherein the processor is further configured to:
determine whether a service identified by the service type is a big data service;
select a bandwidth occupied rate distribution (BORD) manner as the latency distribution manner when the processor determine that the service identified by the service type is a big data service;
obtain traffic in the domain managed by each of the plurality of DCs;
calculate a percentage of the traffic of each DC in a total bandwidth of the DC based on the obtained traffic; and
divide the first latency into the plurality of latency periods based on a ratio between the percentages of the traffic of the plurality of the DCs in the total bandwidths of the DCs.

13. A method for establishing a forwarding path in a network, wherein the network comprises a super controller (SC) and a plurality of domain controllers (DCs), the SC manages the plurality of DCs, each of the plurality of DCs manages one domain, and the method comprises:
receiving, by the DC, a latency period sent by the SC, wherein the latency period is obtained by the SC after the SC selects a latency distribution manner based on a service request message and then divides a first latency in the service request message;
establishing, by the DC, a forwarding path segment in the managed domain, wherein a latency of the forwarding path segment is less than or equal to the latency period; and
sending, by the DC, information about the forwarding path segment to the SC, and triggering the SC to connect the plurality of forwarding path segments established by the plurality of DCs, to form a forwarding path.

14. The method according to claim 13, wherein when a difference between quantities of network nodes in the domains managed by the plurality of DCs is in a predetermined range, the latency distribution manner selected by the SC is an average latency distribution (ALRD) manner, and the dividing, by the SC, the first latency based on the ALRD manner, to obtain the latency period comprises:
    equally dividing, by the SC, the first latency based on a quantity of the DCs, to obtain the latency period.

15. The method according to claim 13, wherein when a service identified by the service type is a latency-sensitive service, the latency distribution manner selected by the SC is a minimum latency rate distribution (MIRD) manner, and the dividing, by the SC, the first latency based on the MIRD manner, to obtain the latency period comprises:
    obtaining, by the SC, a second latency of a path having a minimum latency in paths in the domain managed by each of the plurality of DCs; and
    dividing, by the SC, the first latency based on a ratio between the obtained plurality of second latencies, to obtain the latency period.

16. The method according to claim 13, wherein when a service identified by the service type is a latency-insensitive service, the latency distribution manner selected by the SC is a maximum latency rate distribution MARD manner, and the dividing, by the SC, the first latency based on the MARD manner, to obtain the latency period comprises:
    obtaining, by the SC, a third latency of a path having a maximum latency in paths in the domain managed by each of the plurality of DCs; and
    dividing, by the SC, the first latency based on a ratio between the obtained plurality of third latencies, to obtain the latency period.

17. The method according to claim 13, wherein when a service identified by the service type is a service in which a size of a to-be-transmitted file exceeds a preset value, the latency distribution manner selected by the SC is an average fiber utilization rate distribution AFRD manner, and the dividing, by the SC, the first latency based on the AFRD manner, to obtain the latency period comprises:
    obtaining, by the SC, a fiber utilization rate in the domain managed by each of the plurality of DCs; and
    dividing, by the SC, the first latency based on a ratio between the obtained plurality of fiber utilization rates, to obtain the latency period.

18. The method according to claim 13, wherein when a service identified by the service type is a big data service, the latency distribution manner selected by the SC is a bandwidth occupied rate distribution BORD manner, and the dividing, by the SC, the first latency based on the BORD manner, to obtain the latency period comprises:
    obtaining, by the SC, traffic in the domain managed by each of the plurality of DCs, and calculating, based on the obtained traffic, a percentage of the traffic of each DC in a total bandwidth of the DC; and
    dividing, by the SC, the first latency based on a ratio between the percentages of the traffic of the plurality of the DCs in the total bandwidths of the DCs, to obtain the latency period.

19. The method according to claim 13, wherein the latency distribution calculation manner selected by the SC is a customized latency rate distribution manner, and the SC divides the first latency based on a ratio specified by a user, to obtain the latency period.

20. A domain controller (DC) for establishing a forwarding path in a network, wherein the network comprises a super controller SC and a plurality of DCs, the SC manages the plurality of DCs, each of the plurality of DCs manages one domain, and the DC comprises:
    a network interface; and
    a processor coupled to the network interface,
wherein
    the network interface is configured to receive a latency period sent by the SC,
    the latency period is obtained by the SC after the SC selects a latency distribution manner based on a service request message and the SC divides a first latency in the service request message,
    the processor is configured to establish a forwarding path segment, wherein a latency of the forwarding path segment is less than or equal to the latency period, and
    the network interface is configured to send information about the forwarding path segment to the SC, and trigger the SC to connect the plurality of forwarding path segments established by the establishment units, to form the forwarding path.

\* \* \* \* \*

UNITED STATES PATENT AND TRADEMARK OFFICE
CERTIFICATE OF CORRECTION

PATENT NO. : 11,290,568 B2
APPLICATION NO. : 16/703675
DATED : March 29, 2022
INVENTOR(S) : Huang et al.

It is certified that error appears in the above-identified patent and that said Letters Patent is hereby corrected as shown below:

In the Specification

Column 11, Lines 1-6 should be replace with:
"For example:
Td1 = Node(pe1) + node(abr1) + node(asbr1) + link(pe1 – abr1) + link(abr1 – asbr1)
Td2 = Node(pe1) + node(abr1) + node(abr2) + node(asbr2) + node(asbr1) + link(pe1 – abr1) + link(abr1 – abr2) + link(abr2 – asbr2) + link(asbr2 – asbr1)"

Signed and Sealed this
Seventeenth Day of May, 2022

Katherine Kelly Vidal
*Director of the United States Patent and Trademark Office*